United States Patent
Pallone et al.

(10) Patent No.: US 8,280,083 B2
(45) Date of Patent: Oct. 2, 2012

(54) POSITIONING OF SPEAKERS IN A 3D AUDIO CONFERENCE

(75) Inventors: Gregory Pallone, Lannion (FR); Arnault Nagle, Lannion (FR)

(73) Assignee: France Telecom, Paris (FR)

( * ) Notice: Subject to any disclaimer, the term of this patent is extended or adjusted under 35 U.S.C. 154(b) by 1132 days.

(21) Appl. No.: 12/215,421

(22) Filed: Jun. 27, 2008

(65) Prior Publication Data

US 2009/0041271 A1 Feb. 12, 2009

(30) Foreign Application Priority Data

Jun. 29, 2007 (FR) .................................... 07 04712

(51) Int. Cl.
*H04R 5/02* (2006.01)
*H04R 5/00* (2006.01)

(52) U.S. Cl. .......... 381/300; 381/310; 381/17; 379/158; 379/202.01; 370/260

(58) Field of Classification Search .................. 381/300, 381/306, 309, 310, 17, 18; 700/94; 379/158, 379/202.01; 709/204, 207, 205; 370/260
See application file for complete search history.

(56) References Cited

U.S. PATENT DOCUMENTS

| | | | | |
|---|---|---|---|---|
| 5,991,385 A * | 11/1999 | Dunn et al. | ............... | 379/202.01 |
| 6,125,115 A * | 9/2000 | Smits | ........................... | 370/389 |
| 7,012,630 B2 * | 3/2006 | Curry et al. | ................ | 348/14.08 |
| 7,612,793 B2 * | 11/2009 | Potekhin et al. | ........... | 348/14.01 |
| 7,724,885 B2 * | 5/2010 | Jarske et al. | ............. | 379/202.01 |
| 7,787,631 B2 * | 8/2010 | Faller | ............... | 381/20 |
| 8,073,125 B2 * | 12/2011 | Zhang et al. | ............. | 379/202.01 |
| 8,208,664 B2 * | 6/2012 | Iwasaki | ......................... | 381/310 |
| 2003/0063574 A1 * | 4/2003 | Virolainen | ................... | 370/260 |
| 2005/0157660 A1 * | 7/2005 | Mandato et al. | .............. | 370/254 |
| 2006/0133619 A1 * | 6/2006 | Curry et al. | ..................... | 381/26 |
| 2007/0003069 A1 * | 1/2007 | Faller | .............................. | 381/17 |
| 2007/0025538 A1 * | 2/2007 | Jarske et al. | ............. | 379/202.01 |
| 2007/0071204 A1 | 3/2007 | Kanada | | |
| 2008/0144794 A1 * | 6/2008 | Gardner | ................... | 379/202.01 |
| 2008/0319764 A1 * | 12/2008 | Nagle et al. | .................... | 704/500 |
| 2010/0215164 A1 * | 8/2010 | Sandgren et al. | ........ | 379/202.01 |
| 2010/0266112 A1 * | 10/2010 | Burstrom et al. | ........ | 379/202.01 |
| 2010/0303266 A1 * | 12/2010 | Chen et al. | .................... | 381/310 |
| 2010/0316232 A1 * | 12/2010 | Acero et al. | .................... | 381/92 |
| 2011/0051940 A1 * | 3/2011 | Ishikawa et al. | ................ | 381/22 |
| 2011/0091055 A1 * | 4/2011 | Leblanc | ........................ | 381/303 |

FOREIGN PATENT DOCUMENTS

EP 1515570 A 3/2005
WO WO 2007/006856 A 1/2007

OTHER PUBLICATIONS

Zheng, Fang, et al.; "Comparison of Different Implementations of MFCC"; Center of Speech Technology, State Key Lab of Intelligent Technology and Systems, Department of Computer Science and Technology, Tsinghua University, Beijing, 100084, P.R. China; J. Computer Science & Technology, 16(6): 582-589, Sep. 2001. Grey, John M., et al.; "Perceptual effects of spectral modifications on musical timbres"; Center for Computer Research in Music and Acoustics, Artifical Intelligence Labboraory, Stanford University, Stanford, California 94305; Received Aug. 1, 1977; revised (Jan. 3, 1978).
Kilgore, et al.: "Spatialized Audio conferencing: What are the Benefits?"; Department of Mechanical and Industrial Engineering, University of Toronto, 2003.

* cited by examiner

Primary Examiner — Edgardo San Martin

(74) Attorney, Agent, or Firm — McKenna Long & Aldridge LLP

(57) ABSTRACT

A method, implemented by electronic data processing resources, for audio conference between conference participants via their respective terminals, the participants including at least one listener and at least one speaker, the method comprising, for at least said listener and for at least said speaker, the steps consisting in, estimating, as a function of a digital signal coming from a terminal of the speaker, at least one characteristic specific to said speaker, and determining, using said at least one estimated characteristic, a setpoint for positioning the speaker within a virtual space of the listener.

11 Claims, 8 Drawing Sheets

POSITIONING OF SPEAKERS IN A 3D AUDIO CONFERENCE

This application claims the benefit of French Patent Application No. 07 04712, filed on Jun. 29, 2007, which is hereby incorporated by reference for all purposes as if fully set forth herein.

BACKGROUND OF THE INVENTION

The invention relates to the field of spatialized audio conferences.

An audio conference consists in bringing people into contact via their audio terminals. The audio streams may for example be according to the TCP/IP protocol, in which case it is referred to as 'voice over IP'. The invention is not of course limited to a particular network. For example, the audio conference may be implemented with an integrated services digital network (ISDN).

Terminals in conference mode may, for example, communicate according to a centralized mode, thanks to an MCU (Multipoint Control Unit) conference bridge that centralizes the audio streams before mixing them and distributing them appropriately. Alternatively, the terminals may communicate by adopting a 'multicast' mode, in which each audio stream is characterized by a source address and by a group address, or else by adopting a distributed mode using multiple point-to-point links. Generally speaking, the invention is not limited by the architecture implemented.

It is known for a given conference participant, in this context referred to as listener, to virtually spatialize the voices of the other conference participants, referred to as speakers, in a 3D audio virtual space in order to recreate the illusion of a real conversation. The listener thus has the impression that the voice of each speaker is coming from a particular position in space. The spatialization of the voices contributes to improving the intelligibility, the listening comfort, the understanding and the recognition of the speakers.

Depending on the architecture adopted, the spatialization may take place either over a bridge, in particular in centralized mode, or over the terminal, in particular in multicast and distributed modes.

The article by Mark Chignell, Ryan Kilgore and Paul Smith, "Spatialized Audioconferencing: What are the Benefits?", 2003 Conference of the Centre for Advanced Studies on Collaborative Research, describes an application for setting up spatialized audio conferences over IP networks that enables the conference participants to virtually position the various speakers for their convenience. A positioning interface needs to be provided for each participant. In addition, the participants have to carry out manual operations in order to position the various speakers.

THE SUMMARY OF INVENTION

The invention aims to remedy these drawbacks.

According to a first aspect, an object of the invention is a method implemented by electronic data processing resources, for audio conferencing between conference participants via their respective terminals, the participants including at least one listener and at least one speaker, the method comprising, for at least this listener and for at least this speaker, the steps of estimating, as a function of a digital signal received from a terminal of the speaker, at least one characteristic specific to this speaker, and determining a setpoint for positioning the speaker in a virtual space of the listener using this at least one estimated characteristic.

The setpoint is determined by electronic data processing resources, using a characteristic specific to the speaker estimated from the digital signal corresponding to this speaker. The invention thus allows the speakers to be automatically placed in an optimal manner within the 3D space, and does this irrespective of the number of speakers.

Carrying out a random positioning of the speakers within the 3D space is a technique known from the prior art. With the method according to one aspect of the invention, one or more characteristics of the digital signal coming from the speaker's terminal are taken into account in order to determine the setpoint, a fact which allows a more relevant positioning than a simple random positioning.

Furthermore, the method according to one aspect of the invention allows the operations associated with a manual positioning, such as that described in the article by M. Chignell, to be avoided.

Moreover, it is no longer necessary to provide an interface for each terminal.

It will also be noted that, in the prior art, for a user positioning the speakers himself, an optimal positioning may prove to be difficult beyond a few participants. The method according to one aspect of the invention allows an optimal positioning to be guaranteed however many speakers are present.

The digital signal may for example comprise at least one header field and/or a speech digital audio signal.

The characteristic specific to the speaker may for example be estimated from the header field of the digital signal, where present, specifying for example the name or the company of the speaker, and/or from the speech audio signal, where present, for example by estimating certain characteristics of the voice of the speaker. The presence of a header field or of a speech audio signal within the digital signal does not systematically lead to an estimation of the characteristic specific to the speaker based on the header field or from the speech audio signal, respectively.

The steps for estimation of the characteristic of the speaker and for determination of the setpoint, referred to as positioning steps, may be carried out for all the other conference participants. Of course, it may be decided to determine a positioning setpoint for only some of the other participants, and a manual positioning or a mono sound for the remaining participants.

Advantageously, in the case where there are several speakers, the positioning steps are carried out for at least two speakers. For each of these at least two speakers, the step for determining the setpoint of this speaker is furthermore carried out using at least one previously estimated characteristic for at least one other speaker from amongst these at least two speakers.

In other words, during the positioning of a speaker, the characteristics estimated for the other speakers are taken into account. The positioning within virtual space may thus be optimized.

The invention is not in any way limited by this embodiment, even when there are several speakers. It may for example be decided to determine the positioning setpoint for each speaker using only the estimated characteristics for this speaker, then potentially to modify the setpoint depending on the setpoints determined for the other speakers.

The method, object of the invention, may of course be implemented even where there is only a single speaker. For example, the speech audio signal of this speaker is analysed in order to estimate a vocal power, and the speaker is virtually positioned at a virtual source closer to or further away from the listener depending on the power of his voice.

Advantageously, the method also comprises a step for spatialization of the speaker using the positioning setpoint for this speaker. The setpoint determination step and the spatialization step may be carried out on the same device, or on separate devices that could be remote from each other.

It goes without saying that the conference participants may be both listeners and speakers, depending on the participant (referred to as "listener" in this context) for whom all or some of the participants (referred to as "speakers" in this context) are virtually spatialized. The steps for positioning and spatializing all or some of the other participants may be carried out for each of the participants, in other words each participant is a listener, or for only some of the participants, for example those who have registered their subscription for this spatialization service, or who possess a suitable terminal.

The invention may be implemented irrespective of the architecture adopted. For example, in the case of a centralized architecture, the invention may be implemented by a bridge receiving signals coming from terminals. In the prior art, the possibility afforded to a listener of being able to virtually place the speakers for his convenience implies a dialogue between the bridge and the terminal of this listener. A decision of a user on a terminal relating to the virtual position of one of his speakers leads to a spatialization processing operation carried out on the bridge. The invention allows such a complexification of the dialogues between the bridge and the terminals to be avoided in the case of a centralized architecture, and any modification of the signalling protocols associated with this complexification to be avoided.

In the case of a distributed architecture, the steps according to the invention leading to the spatialization for a given listener may for example be carried out by the terminal of this listener.

The spatialization step may for example be based on the ITD (Interaural Time Difference) and the ILD (Interaural Level Difference), or else on the HRTF (Head Related Transfer Function). The invention is not of course limited by the spatialization method implemented.

The invention is not limited by the characteristic specific to the speaker estimated with a view to determining the positioning setpoint for this speaker. A 'characteristic specific to the speaker' may just as easily refer to the characteristics specific to the speaker himself as to the characteristics specific to the terminal used by the speaker.

Thus, for example, the name of the company to which the speaker belongs, the name of the speaker, the geographical position of the speaker, or the hierarchical importance of the speaker may constitute characteristics of the speaker. The examples of characteristics hereinbelow may be obtained directly from the terminal, for example during an initial interrogation phase of the speaker. Transmission of these characteristics via the SIP protocol (Session Initiation Protocol), defined in the specification IETF RFC3261, may for example be chosen.

For example, in the framework of a centralized architecture, information on the names of the various participants may be uploaded to a bridge. The conference participants are categorized in alphabetical order and, for each listener, the speakers are positioned within virtual space, for example on a row, in such a manner that the order within the row is the alphabetical order. The bridge then carries out the spatialization processing operations so that each listener hears the voice of each speaker as if it came from a virtual source placed at the position thus determined.

The digital signal coming from a terminal may thus comprise, for example in a header field, the characteristic or characteristics specific to the corresponding speaker, such as for example the name of the company of the speaker, and based on which the setpoint is determined.

Advantageously, the digital signal coming from the terminal comprises a speech audio signal from the speaker and the step for estimating the characteristic specific to the speaker as a function of the received signal comprises a step for estimating a characteristic of the voice of the speaker as a function of this speech audio signal.

For example, the voice of the speaker may be analysed for the purposes of recognition of the speaker from amongst a list of speakers. Once the speaker has been recognized, for example by means of cepstrum coefficients, he may then be positioned by using another characteristic of the recognized speaker, for example his name. For example, the speakers are positioned taking their alphabetical order into account. The setpoint is therefore determined indirectly based on the cepstrum coefficients.

The characteristic of the voice of the speaker may be used directly during the determination of the setpoint. The characteristic of the voice of the speaker may for example comprise the power of the voice of the speaker. In this case, it may be decided to position the speakers whose voices are relatively loud at a virtual location relatively far away from the listener.

The characteristic of the voice of the speaker may comprise the vocal occurrence: for example, a speaker who talks frequently is virtually placed substantially in front of the listener, whereas a less vocal speaker is virtually placed on the sides of the listener.

For example, in the case where the number of participants at the conference reaches or exceeds three, an attempt may be made to estimate the distances, in the Euclidian sense of the term, between the various voices of the speakers. It may thus be decided to virtually position the speakers whose voices are relatively close at positions that are relatively far from one another.

More generally, distances between speakers may be estimated using characteristics specific to these speakers, whether vocal or otherwise.

The distances may for example be estimated on the basis of comparisons between sets of at least one coefficient each, this at least one coefficient being obtained by analysing the speech audio signal of a speaker (in this respect, these comparisons are between frequency components of the voices of the speakers). In other words, the characteristic of the voice of the speaker used for determining the setpoint then comprises frequency components of the voice of this speaker.

The invention is not of course limited by any given mode of calculation of the distances between the voices. For example, the distances may be estimated on the basis of comparisons of cepstrum coefficients.

Nor is the invention limited by the manner in which the conference is set up. For example, it may be planned that all the participants start their participation in the conference substantially at the same time, for example following a proposal of one of the participants. In this case, the determinations of setpoints may be carried out in one go, at the start of the conference.

The possibility of leaving the conference or of being invited to join the conference during the course of the conference may be afforded to the participants. In this case, it may be planned to carry out the step for determining the setpoint on the arrival of a new participant, and potentially on the departure of a participant. The arrivals and the departures of speakers are thus taken into account.

For example, following the arrival of a new speaker, the setpoint determination step is carried out for each of the speakers, and by taking into account the characteristics of the other speakers, which thus allows optimal positioning of the speakers.

Alternatively, it may be decided to carry out the step for determining a setpoint only for the new speaker (and potentially by taking into account the characteristics of the other speakers), in order not to disturb the listener used to the previous positioning of the speakers. The virtual positions of the speakers already positioned may remain unchanged, or else be slightly modified in order to take into account the positioning of the new speaker.

According to another aspect, an object of the invention is a device designed to be used in the framework of an audio conference between participants via their respective terminals. The conference participants comprise at least one speaker and at least one listener, an input for receiving signals coming from a terminal of the speaker, processing means for estimating, as a function of the received signal, at least one characteristic specific to the speaker, and determining using this at least one estimated characteristic a setpoint for positioning the speaker within a virtual space of the listener. The device also comprises an output for delivering the setpoint, for example to a, potentially remote, spatializer bridge, or else to spatialization means which could be integrated into the same processor as the processing means.

For example, in the case of a centralized architecture, this device may be integrated into a bridge, or comprise the bridge. In the case of a distributed architecture or multicast, this device may be integrated into (or comprise) a terminal. The signals coming from the terminal may be received directly from the terminal, or else indirectly. These signals may for example have transited via a replicating bridge.

The device according to this aspect of the invention may also comprise spatialization means for processing the stream corresponding to each speaker for the purposes of spatialization. Spatialization means may also be provided that are separate, and potentially remote, from the device according to this aspect of the invention.

According to another aspect, an object of the invention is a system for an audio conference between participants via their respective terminals, comprising the device according to one aspect of the invention and these terminals (or a bridge, as the case may be).

According to another aspect, an object of the invention is a computer program designed to be stored in a memory of a device designed to be used in the framework of an audio conference between participants via their respective terminals, and/or stored on a storage medium designed to cooperate with a reader of this device and/or downloaded via a telecommunications network. The conference participants include at least one speaker and at least one listener. The program comprises instructions for executing, for at least the listener and for at least the speaker, the steps of the method according to one aspect of the invention.

BRIEF DESCRIPTION OF THE DRAWINGS

Other features and advantages of the present invention will become apparent in the description hereinafter.

DETAILED DESCRIPTION OF THE ILLUSTRATED EMBODIMENTS

In the various figures, identical or similar objects may be denoted by the same reference numbers.

Figure 1:
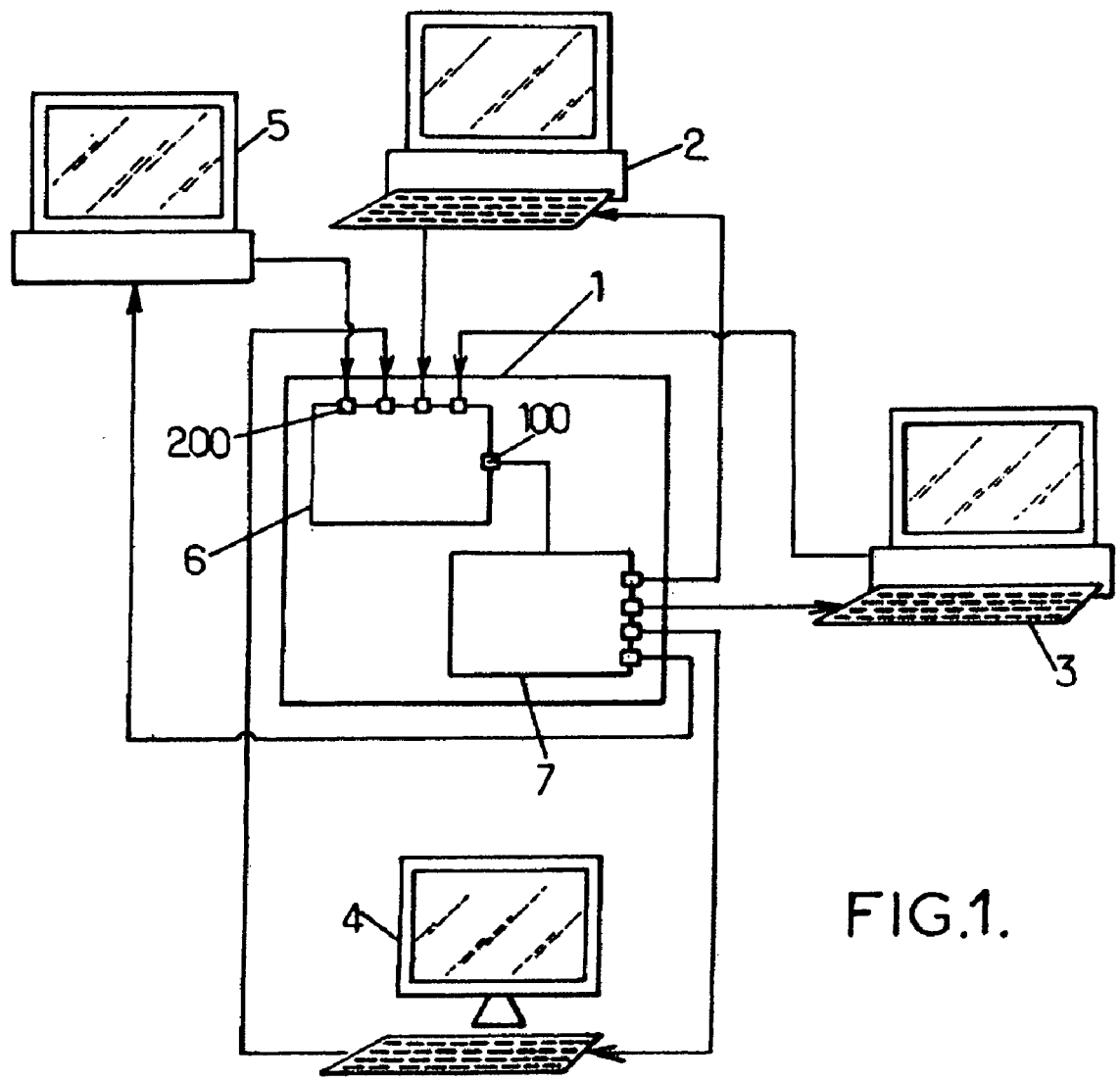
FIG. 1 shows an example of a system according to one embodiment of the invention.

FIG. 1 shows an example of distributed system comprising terminals 2, 3, 4, 5 communicating via an MCU bridge 1. The users (not shown) of these terminals may participate in audio conferences. During an audio conference, the audio streams, represented by simple arrows indicating their direction of flow, are received by the MCU bridge 1 from the terminals and redistributed in such a manner that each terminal receives a stream resulting from the mixing of the streams transmitted by the other terminals.

The bridge 1 also comprises spatialization means, for example a processor 7 of the DSP (Digital Signal Processor) type dedicated to the processing of the audio streams. For a given transmitting terminal and a given addressee terminal, the DSP 7 processes the stream from this transmitting terminal in such a manner that the user of this addressee terminal hears the sound corresponding to this stream as if it had been emitted by a virtual source at a given position.

The MCU bridge also comprises processing means 6, also referred to as positioning means. These means 6 may, for example, comprise another processor 6 for processing the DSP signal. Alternatively, the processors 6, 7 may be one and the same.

For each addressee terminal, in other words for each user referred to as listener in this context, the processor 6 allows the virtual positions of the other users, referred to as speakers in this context, to be determined. For each speaker of a given listener, in other words for the terminals other than the addressee terminal, the processor 6 carries out this positioning automatically, based on one or more characteristics of this speaker.

For this purpose, the processor 6 comprises inputs 200 receiving signals coming from the terminals 2, 3, 4, 5, and an output 100 delivering positioning setpoints to the processor 7.

Figure 2:
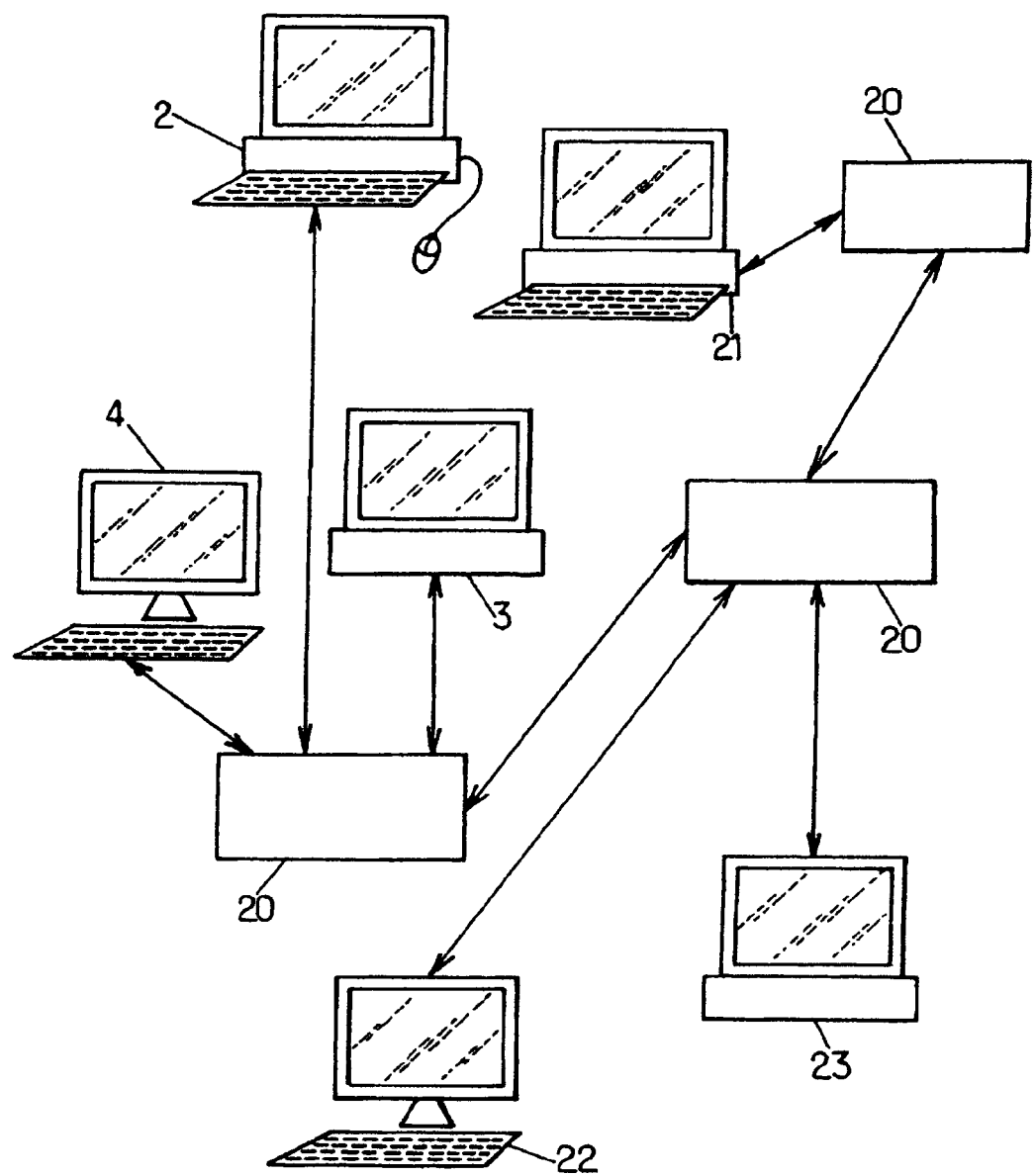
FIG. 2 shows an example of a system according to another embodiment of the invention.
Figure 3:
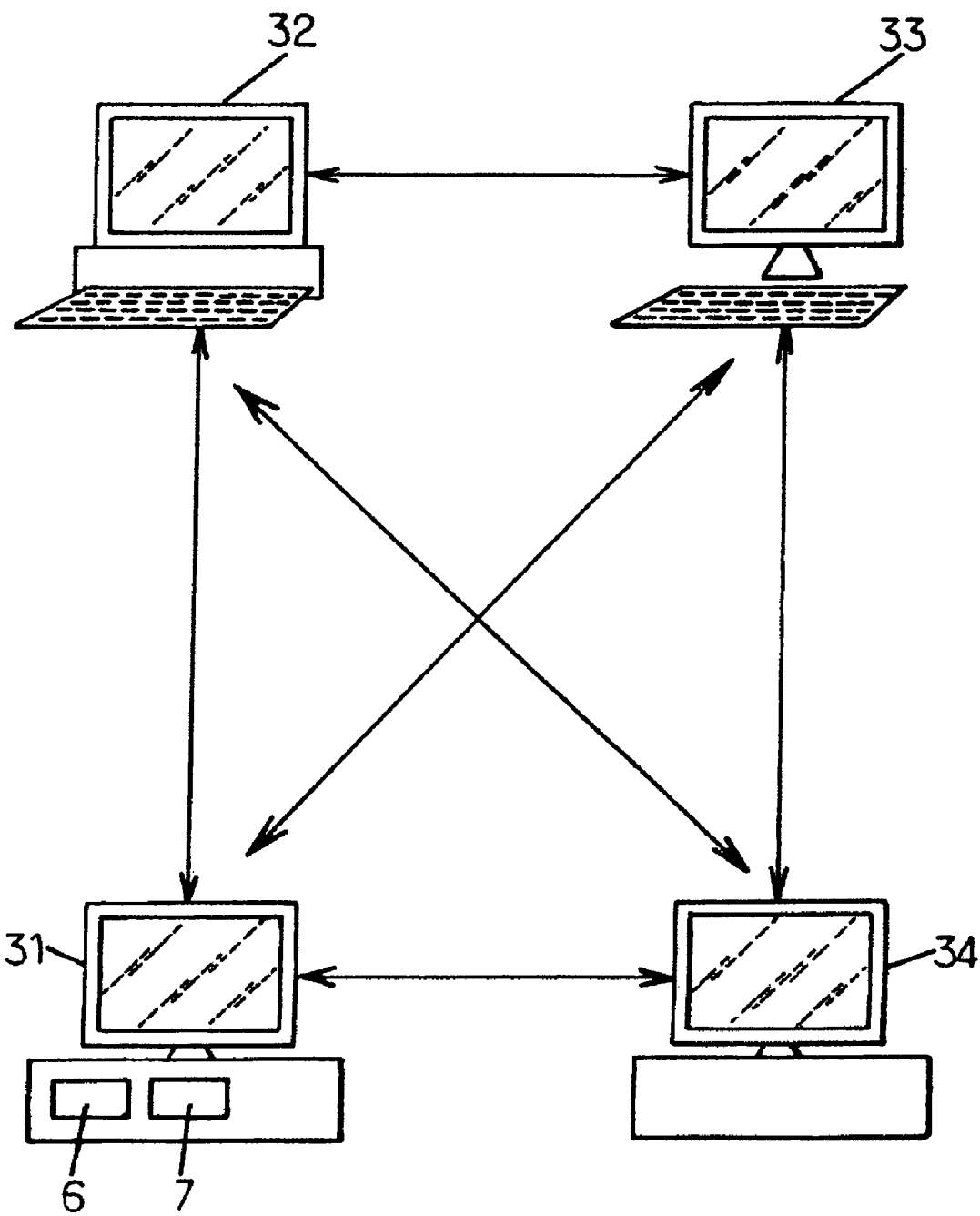
FIG. 3 shows an example of a system according to yet another embodiment of the invention.

FIG. 2 shows an example of a system with a Multicast architecture. The audio streams transmitted or received by the terminals 2, 3, 4, 21, 22, 23 transit via routers 20. In this example, each of the terminals 2, 3, 4, 21, 22 and 23 comprises the positioning means and the spatialization means (not shown). FIG. 3 shows an example of a system with a distributed architecture. The terminals 32, 33, 34, 35 communicate directly with one another and integrate the means 6, 7. Alternatively, devices (not shown) dedicated to the positioning and the spatialization may be provided at the input of each terminal.

Figure 4:
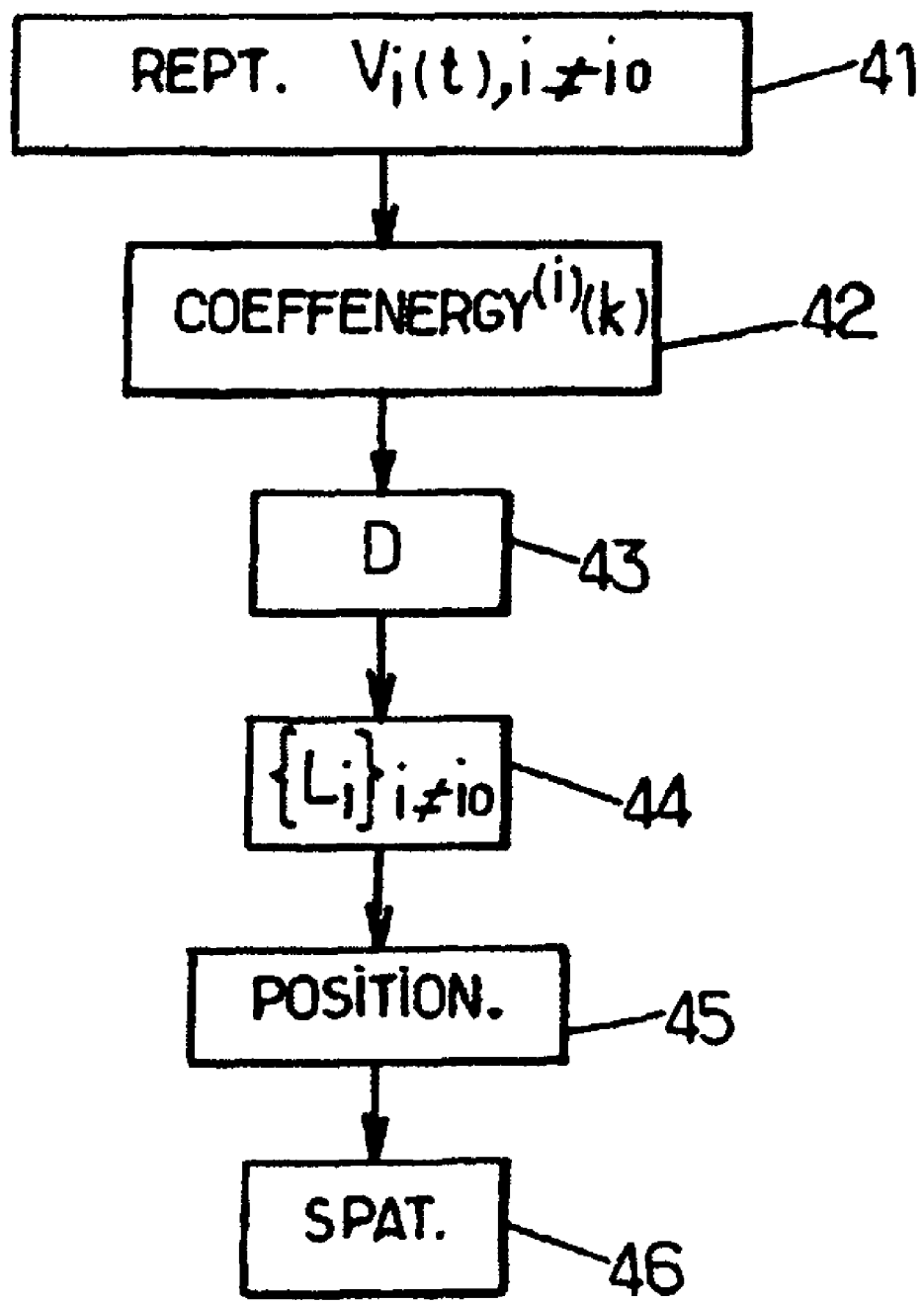
FIG. 4 is an algorithm for one example of a method according to one embodiment of the invention.

FIG. 4 shows an algorithm for one example of a method according to one embodiment of the invention. For a given listener, indexed $i_O$, this algorithm allows the voices of the other participants, referred to as speakers, to be spatialized. The speakers are indexed with the index i.

In this embodiment, the speakers are positioned by taking into account a criterion for maximizing the vocal distances between the voices of the various speakers in the conference.

The automatic positioning of the voices in the 3D audio virtual space is carried out by establishing a matrix of the distances between the voices, by positioning the voices in an optimal fashion using the distance maximization criterion.

As a first step, the voices of the speakers are recorded (step 41), for example during an intialization phase, or else quite simply at the start of the conference. Each vocal signal $V_i(t)$ is then analysed in order to estimate a characteristic $\text{coeffEnergy}^{(i)}_{(k)}$ of the voice (step 42).

More precisely, a bank of K filters $\text{TimeFilters}_{(k)}$ may be used, where K is for example equal to 24. The frequency bandwidth of each filter may be modelled on the Bark scale in order to come as close as possible to the perception of the ear. Reference may be made to the publication by H. Fletcher, "Auditory Patterns", Review of Modem Physics, 12, pages 47-65, January 1940. The frequencies Freqscale on a linear scale are transformed into frequencies Freq2bark on a Bark scale thanks to the following relationship:

$$Freq2bark = \frac{26.81}{1 + \frac{1960}{Freqscale}} - 0.53$$

The width of the filters is thus relatively constant at low frequencies and proportional to the frequency at high frequencies. The cutoff frequencies of the filters may for example take the following values (in Hz): 20, 122, 212, 309, 416, 534, 663, 807, 968, 1148, 1353, 1585, 1853, 2166, 2533, 2972, 3506, 4170, 5018, 6139, 7687, 9968, 13662, 19996.

For each speaker, the frequency sub-bands $\text{subband}^{(i)}_{(k)}$ are calculated over a portion of the sampled vocal signal $V_i(n)$ by filtering the signal with the pulse responses corresponding to the filters $\text{TimeFilters}_{(k)}$:

$$\text{subband}_{(k)}^{(i)}(n) = (V_i * \text{TimeFilter}_{(k)})(n)$$

where * denotes the convolution product and n indexes the time samples.

For each of the signals in the sub-band $\text{subband}^{(i)}_{(k)}$, a window win, of the Hanning type for example, is applied centred on 0. Then, the energy of this windowed signal is calculated. The operation is reiterated shifting the window by 0.004 s for example, until the time portion of filtered vocal signal runs out. A short-term energy $STE_{h,k}^{(i)}$ may thus be calculated:

$$STE_{(h,k)}^{(i)} = \sum_n (\text{subband}_{(k)}^{(i)}(n) \times win(n-h))^2$$

where h corresponds to a period of 0.004 s for example.

In order to obtain one energy coefficient $\text{coeffEnergy}^{(i)}_{(k)}$ per sub-band and per speaker, the short-term energy $STE_{h,k}^{(i)}$ may then be averaged over h and normalized to the total energy, in other words the energy of the vocal portion for this speaker and for all the bands, in order to be able to be compared with energy coefficients of other speakers:

$$\text{coeffEnergy}_{(k)}^{(i)} = \frac{\overline{STE_{(h,k)}^{(i)}}}{\sum_n (V_i(n))^2}$$

The distances between the voices of the speakers are estimated during a step 43, on the basis of comparisons of the $\text{coeffEnergy}^{(i)}_{(k)}$ characteristics;

$$D(i, i') = \sqrt{\sum_{k=1}^{K} (\text{coeffEnergy}_{(k)}^{(i)} - \text{coeffEnergy}_{(k)}^{(i')})^2}$$

The values of the distances D(i, i') between speakers i, i' allows a matrix D with zero values on the diagonal to be obtained.

The higher the value of D(i, i'), the more dissimilar are the voices of the speakers i, i'.

According to one alternative embodiment, the matrix of the distances D is determined based on the idea of the spectral centroid defined in the publication by J. M. Grey and J. W. Gordon, "Perceptual Effects of Spectral Modifications on Musical Timbres", Journal of the Acoustic Society of America, 63(5): 1493-1500, 1978:

$$sc = \frac{\sum_{k=1}^{K_{FFT}-1} kX(k)}{\sum_{k=1}^{K_{FFT}-1} X(k)}$$

where sc represents an energy value for a given speaker, X(k) is the value of the Fast Fourrier Transform or FFT of the vocal signal for the $k^{th}$ Fourier component, and $K_{FFT}$ is the length, in number of components, over which the fast Fourier transform has been carried out.

The matrix of the distances may then be obtained by calculating energy value differences for individual speakers.

According to another alternative, a matrix of the distances D(i, i') may be calculated based on the methods known in the field of automatic voice recognition. For each speaker, the cepstrum coefficients are calculated on the Mel or MFCC (Mel-frequency Cepstrum Coefficients) scale over a portion of the vocal signal of this speaker. Reference may be made to the publication by F. Zheng, G. Zhang and Z. Song, "Comparison of different implementations of MFCC", J. Computer Science and Technology, 16(6): 582-589, December 2001.

The MFCC coefficients may be given by $$MFCC_i(j) = \sum_{k=1}^{N_{filt}} \log(X_k(j)) \times \cos\left(i\left(k - \frac{1}{2}\right)\frac{\pi}{N_{filt}}\right)$$

where: i represents the MFCC index; for a given voice, a dozen MFCC coefficients describing this voice may for example be counted; j indicates a given field, for example of 1024 time samples; $X_k(j)$ denotes the $k^{th}$ Fourier component obtained by FFT on the points of the field j; and $N_{filt}$ denotes the number of these Fourier components.

According to known methods, the MFCC coefficients may allow the probability $P(X|L_a)$ that an observation X originates from a speaker $L_a$ to be estimated. The distance $D_{a,b}$ between voices of speakers indexed a, b, respectively, may for example be estimated according to:

$$D_{a,b} = 1 - \left(\frac{P(X_b|L_a) + P(X_b|L_a)}{2}\right)$$

where, $X_a$ and $X_b$ denote observations obtained with the speaker a and b, respectively.

Returning now to FIG. 4, once the matrix of the distances D has been established, a positioning setpoint is determined for each speaker. In this example, ordering of the speakers is carried out in a step 44. The order of the speakers is determined from the vocal distances contained in the matrix D. Thanks to a maximization criterion used in the space of the vocal distances, an ordered group $L=\{L_i\}_{i \neq i_0}$ that provides information on which speaker is to be placed next to which other in virtual space is obtained.

For example, it may be desired to maximize the sum of the distances between neighbouring speakers. This sum of the distances is calculated for each ordering scenario envisaged, and the ordering scenario for which this sum is maximized is chosen.

Subsequently, a step 45 for assigning a position to the speaker is carried out. For example, if an order j corresponds to a speaker i, it may be decided to assign to this speaker a position within the frontal half-plane that forms an angle of $$(j-1)\frac{\pi}{N-1},$$

where N is the total number of conference participants, with the position of the speaker furthest to the right. Such a correspondence function between order of the speakers and positions of the speakers in virtual space is relatively simple. It is certainly possible to choose more subtle functions which take into account the spatial resolution of the human ear. Thus, the ear discriminates better the speakers in front of the listener than the speakers positioned on the side.

Moreover, the situation here is limited to a 2D space, but it is clearly possible to generalize it to 3D space. Notions such as the distance or the separation from the listener may also be taken into account.

If the correspondence function between order of the speakers and positions of the speakers is fixed, the step for ordering the speakers may be equated with the determination of a positioning setpoint.

Alternatively, the determination of a positioning setpoint may comprise the ordering step 44 and assignment step 45.

Finally, in a step 46, the streams received from each speaker are spatialized by applying the corresponding setpoints, so that the listener hears the corresponding sound as if it had been emitted by a virtual source at the position thus determined.

The speakers may be ordered according to a circular or semi-circular model, as shown in FIGS. 5A to 5D. The advantage of the circular model is that it does not present any special cases and that it is adapted to a circular representation of the 3D audio virtual space. With a linear model, special cases exist at the ends, but this model is particularly well adapted to a linear or semi-circular representation of the 3D audio virtual space.

Figure 5A:
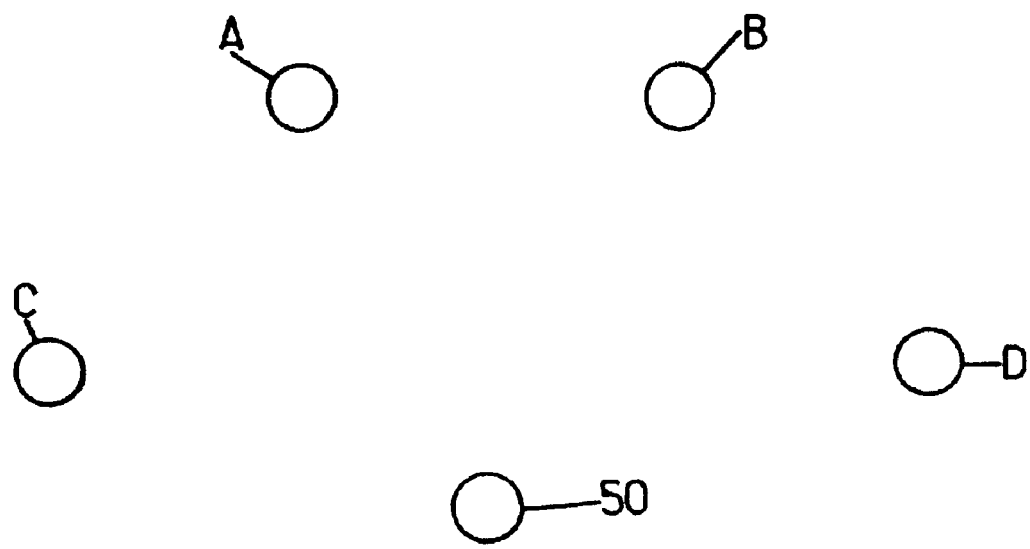
FIG. 5A illustrates schematically one example of basic configuration of the speakers in virtual space.

FIG. 5A illustrates schematically an example of basic configuration of the speakers within virtual space. The speakers A, B, C and D are placed within the virtual space of the listener 50.

It may be envisaged that new participants join the conference or, on the contrary, that some participants leave the conference. In this latter case, the virtual positions of the other participants may for example be left unchanged, or else these positions may be modified, for example using the matrix of the distances.

For a number N of speakers already belonging to the conference, the arrival of the new speaker leads to the estimation of a new ordered group L. Let T be the set of the possible permutations of L and $\zeta_m$ a given permutation of L:

$$T=\{\zeta_m\}_{m \in C}$$

where C is the set of the possible permutations of L.

Several modes of positioning may be envisaged when a new participant arrives. For example, in dynamic mode, the arrival of the new speaker E leads to a new estimation of the matrix of the distances, a new ordering and a new position assignment for each of the speakers. The set C therefore comprises N! permutations.

Figure 5B:
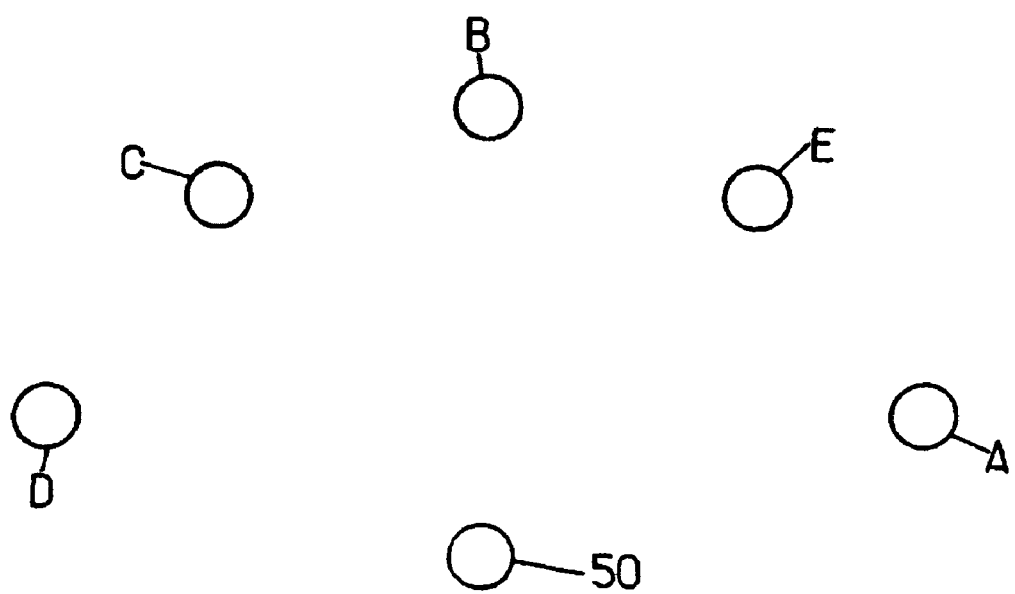
FIGS. 5B, 5C and 5D illustrate schematically examples of configurations of the speakers within virtual space in dynamic, static and fixed position modes, respectively.

As FIG. 5B shows, the virtual positions of the speakers may vary considerably owing to the arrival of a new speaker, but the positioning is optimal in terms of the vocal distances.

Figure 5C:
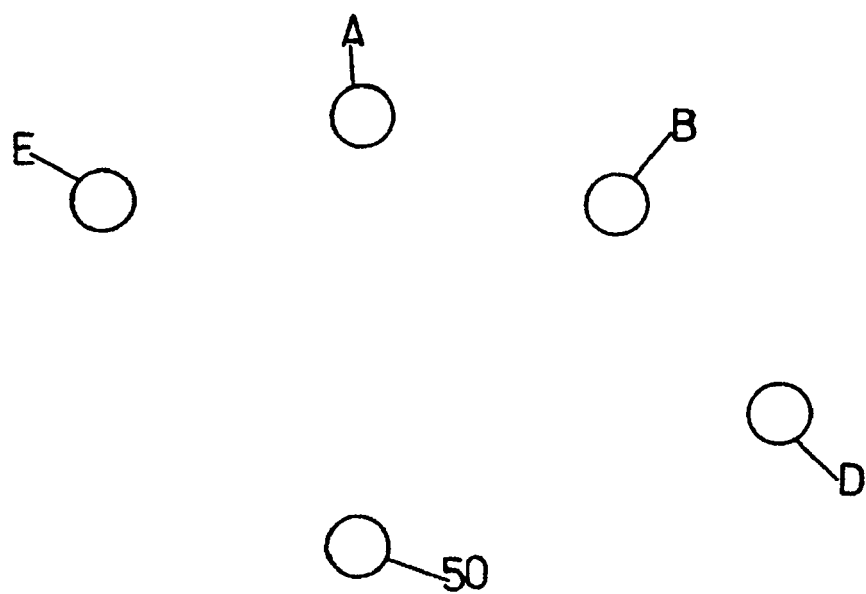

In static mode, only the new speaker E will be positioned based on his voice characteristics, and the positions of the speakers already present are slightly modified in order to facilitate the insertion of the new speaker into the virtual space, as shown in FIG. 5C.

Figure 5D:
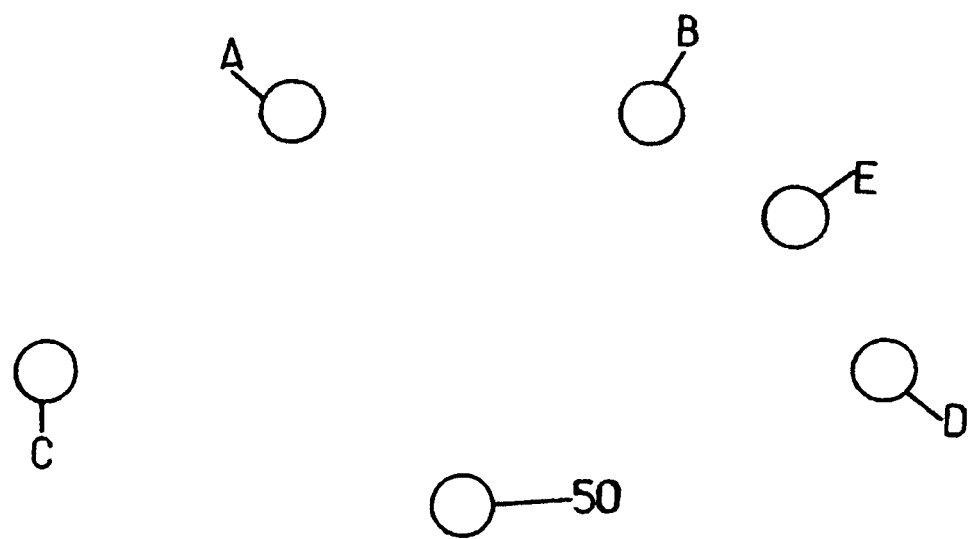

In fixed position mode, the positions of the speakers already present remain unchanged, as shown in FIG. 5D.

In static and fixed position modes, the set C comprises (N−1) possible permutations.

For each permutation, a decision variable $M_m$ is used that allows the relevance of a permutation m to be evaluated. For example, the decision variable $M_m$ is estimated by summing the distances between neighbouring speakers. The permutation maximizing the decision variable $M_m$ is thus determined and hence the new ordering scenario.

For example, for a conference with five participants, and for a given listener from amongst these participants, the four remaining participants, referred to as speakers $L_1, L_2, L_3, L_4$, may for example be ordered according to $\{L_1, L_2, L_3, L_4\}$. Following the arrival of a new participant $L_5$, and in the case of a dynamic mode, this new participant is initially placed arbitrarily at the highest rank, in other words L is now $\{L_1, L_2, L_3, L_4, L_5\}$. If it is determined that $\zeta_{m0}$, defined as follows:

$\zeta_{m0}(L_1)=L_2, \zeta_{m0}(L_2)=L_4, \zeta_{m0}(L_3)=L_1, \zeta_{m0}(L_4)=L_5,$
$\zeta_{m0}(L_5)=L_3$, is the permutation most suitable, the
new set $\{L_2, L_4, L_1, L_5, L_3\}$ is obtained.

In the case of a static mode, the new participant may be inserted either between two other speakers already positioned, or at one end of the ordered set. A criterion for maximizing the vocal distances is used in order to test which insertion position is the best. For each insertion possibility, an estimate of a value characteristic of that insertion is sought.

The invention is not limited to one decision variable equal to the sum of the distances between neighbours. For example, if I, I+1 and X are the respective indices of two consecutive speakers and of the new speaker, the decision variable $M_1$ indicates the relevance of a virtual insertion of the speaker X between the speakers I and I+1:

$$M = \frac{\mu}{1+\sigma}$$

where μ is a mean of the distances given by $$\mu = \frac{D_{I,X} + D_{I+1,X}}{2D_{I,I+1}} \text{ and}$$

$$\sigma = \sqrt{\left(\frac{D_{I,X}}{D_{I,I+1}} - \mu\right)^2 + \left(\frac{D_{I+1,X}}{D_{I,I+1}} - \mu\right)^2}$$

The choice to normalize μ to the vocal distance $D_{I,I+1}$ between the speakers I and I+1 allows the insertion of the new speaker X between two relatively close, in terms of the vocal distance, neighbouring speakers in the 3D audio virtual representation space to be favoured. The normalization of the mean by a standard deviation may lead to favouring the insertion of a new speaker at an equitable distance from the speakers I, I+1.

It is chosen to assign to the new participant the rank that maximizes the value of the decision variable.

By applying the formula for μ and σ hereinabove to the cases of the ends, it will be noted that μ=1 and σ=0. The formula chosen for estimating M allows the case where M is undefined to be avoided. In the case of a positioning in a circle around the listener, the formula for M may be simplified to $$M = \frac{\mu}{\sigma},$$

since the specific cases at the ends are thus avoided.

The principles stated hereinabove may be integrated into a device, for example a bridge or a terminal.

Figure 6:
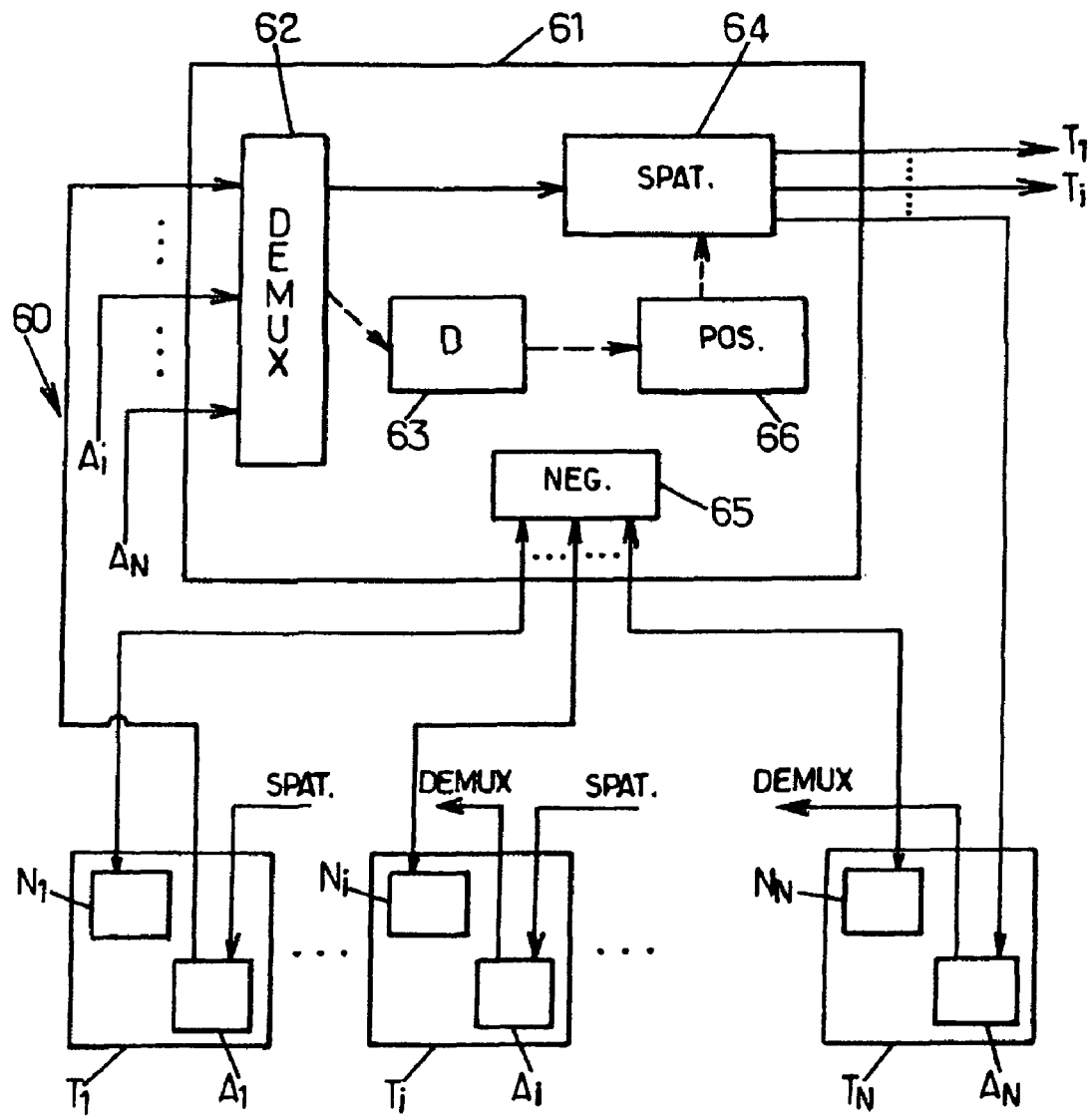
FIG. 6 shows a more detailed example of a system according to one embodiment of the invention.

FIG. 6 shows in more detail an example of a system according to one embodiment of the invention. This system 60 comprises a bridge 61 capable of communicating with terminals $T_1, \ldots, T_i, \ldots, T_N$. It goes without saying that the bridge may be designed to be capable of managing several conferences with several participants in parallel.

The bridge 61 may be seen as an entity composed of several modules 62, 63, 64, 65, 66. In FIG. 6, the dashed arrows represent the transmissions carried out between these modules for the purposes of positioning the speakers. These transmissions may for example be carried out at the start of a conference, following the arrival of a new participant and/or at regular intervals.

Each terminal $T_1, \ldots, T_i, \ldots, T_N$ transmits a signal corresponding to an audio stream to the bridge 60, and receives from the bridge 60 signals corresponding to spatialized audio streams originating from the other terminals.

A negotiation module 66 of the bridge 60 allows signalling messages to be exchanged with the terminals $T_1, \ldots, T_i, \ldots, T_N$ via their respective negotiation modules $N_1, \ldots, N_i, \ldots, N_N$. This module 66 allows conferences to be created, negotiations with the terminals $T_1, \ldots, T_i, \ldots, T_N$ and each terminal $T_1, \ldots, T_i, \ldots, T_N$ to be given an identifier.

A demultiplexer block 62 allows the signal corresponding to the first seconds of speech of a participant to be sent to a block 63 for updating the matrix of distances. Optionally, the block 62 may send this signal in parallel to a spatialization block 64.

The block 63 for updating the matrix of distances allows the separation between two voices to be measured and yields an index of dissimilarity between the latter. The block 63 receives from the block 62 the signal corresponding to a few seconds of voice of a participant, extracts vocal identification parameters from this signal and updates a matrix of vocal distance D.

A block 66 for positioning the speakers by maximization of distances delivers to the spatialization block 64 the positioning setpoints of all the remote speakers and does this for each listener. The block 66 receives from the block 63 the matrix of vocal distance and establishes the positioning setpoints for each participant since two listeners do not have the same sound configuration, as they do not have the same remote speakers.

The spatialization block 64 spatializes the audio streams coming from each participant in order to generate as many sound configurations as there are participants. The spatialization is based on the setpoints that it receives from the block 66 for positioning the speakers by maximization of distances.

It should be noted that this scenario is simplified and that, for example, encoding/decoding blocks could be added if it is desired to compress the mono or spatialized audio data.

Figure 7:
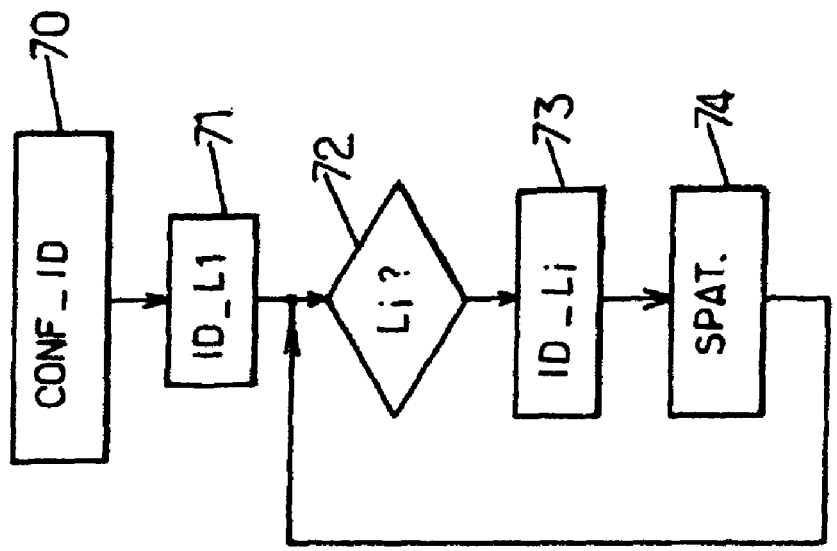
FIG. 7 is one example of an algorithm designed to be executed by a bridge according to one embodiment of the invention.

FIG. 7 is an example of algorithm designed to be executed by the bridge 61. Upon arrival of a first participant, the negotiation block 65 in FIG. 6 creates the conference and obtains a conference identifier (step 70). Following a few words spoken by the lone participant at the conference, the audio stream coming from the terminal and corresponding to these few words is used to record the identification parameters of this participant, in a step 71.

The bridge then goes into standby mode, represented by the test 72, waiting for the arrival or departure of participants for this conference.

When a new participant arrives at the conference, the audio stream coming from the terminal corresponding to this new participant is received. As a first stage, this stream is used to record the identification parameters a few words having been spoken in or out of the conference, in a step 73.

In a second stage, the audio stream is sent to the spatialization block and the matrix of the distances is updated. The new matrix of the distances is used in order to generate positioning setpoints integrating the new participant. In dynamic mode, the order of the other speakers may be changed, in contrast to when in static mode. For each participant, a positioning setpoint, also referred to as positioning vector, is therefore available, which controls the spatialization block (reference 64 in FIG. 6).

The spatialization block sends, to each participant, the audio streams spatialized based on their respective positioning vector.

These steps for updating the matrix, for positioning and for spatialization, already detailed in FIG. 4, are referenced 74 in FIG. 7.

In the case (not envisaged in FIG. 7) of a departure, the audio stream of the corresponding participant is no longer sent to the bridge. In the matrix of distances, the row and the column corresponding to this participant are eliminated, together with the positioning vector corresponding to this participant. The remaining participants may be repositioned, in particular in dynamic mode.

Test steps that are not shown may be included in order to compare the number of participants with zero. If the number of participants is equal to zero, the conference may be closed. Otherwise, the bridge goes back into standby state waiting for arrivals or departures of participants.

The processing operation carried out by the bridge is transparent for the terminals. Each terminal will only negotiate with the bridge a stream uploading to the bridge and a spatialized audio stream downloading, by dialoguing by means of a VoIP signalling protocol.

Speaking a few words outside the conference may allow the system to avoid having to wait for the participant to speak during the conference in order to position him. However, it may be decided to position a silent participant in an arbitrary fashion, and to wait for the first words from this speaker in order to carry out the positioning and spatialization steps. The virtual position of the speaker could be modified in a progressive manner, or else instantaneously.

Figure 8:
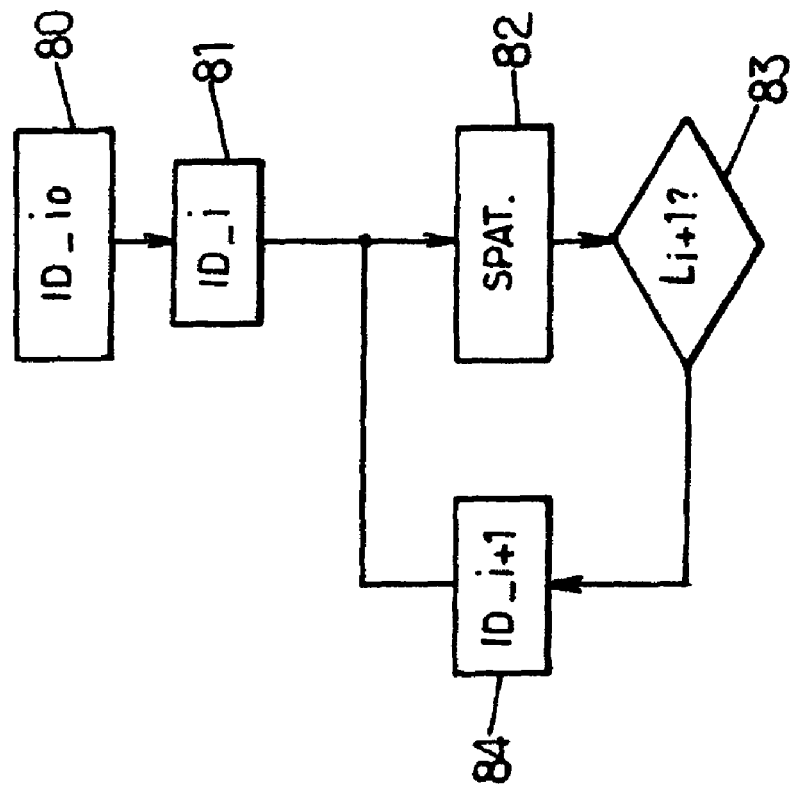
FIG. 8 is one example of an algorithm designed to be executed by a terminal in a system according to one embodiment of the invention.

FIG. 8 is an example of algorithm designed to be executed by a terminal in a system according to one embodiment of the invention. In this embodiment, the positioning of the speakers in conference with a given listener is carried out in the terminal of this listener. The terminal uses the first seconds of speech of each participant in order to virtually position him.

During a step 80, the negotiation block of the terminal of the participant $i_0$ creates the conference and gives an identifier to the participant $i_0$. Then, in a step 81, identifiers are obtained for any other participants already present at the conference. The step referenced 82 represents the steps for estimation of the matrix of the distances, for ordering, for positioning and for spatialization described hereinabove.

The terminal thus receives audio streams, which it spatializes as a function of the transmitter of these audio streams. The terminal also sends audio streams to the other terminals.

One part of the terminal then goes into standby state waiting for arrivals or departures of participants, represented here by the test 83.

In the case of an arrival of a new participant, an identifier is obtained for this new participant in a step 84. Subsequently, the steps for estimation of the matrix of the distances, for ordering, for positioning and for spatialization are repeated, for example for all of the participants (dynamic mode).

In the case (not envisaged in FIG. 8) of a departure of a participant, the terminal stops sending audio streams to this participant. The matrix of the distances is reduced by the row and column corresponding to this participant. The positioning vector corresponding to this participant is eliminated and the remaining participants are, if necessary, repositioned.

Alternatively, it may be decided that each participant communicates his vocal identification parameters to the others, for example in the body of a signalling protocol message, such as SIP for example. This allows the whole process of calculation of the identification parameters to be avoided for each participant and thus the calculation time to be reduced.

The invention may be implemented irrespective of the bandwidth or the quality. It may be envisaged that a relatively noisy voice be spatialized in an isolated manner with respect to the others. The power level of the background noise in the absence of speech from the speaker may be extracted in order to thus influence the virtual position of the speaker.

The invention claimed is:

1. A method, implemented by electronic data processing means, for audio conferencing between conference participants via their respective terminals, the participants including at least one listener and at least one speaker, the method comprising, for at least said listener and for at least said speaker:
   (a) estimating, using a digital signal coming from a terminal of the speaker, at least one characteristic specific to said speaker,
   (b) automatically determining, using said at least one estimated characteristic, a positioning setpoint for positioning the speaker in a virtual 3D space of the listener, and
   (c) spatializing the speaker within the virtual 3D space of the listener, using the positioning setpoint.

2. The method according to claim 1, wherein there exist several speakers, and wherein the steps (a) and (b), are carried out for at least two speakers, and for each of said at least two speakers, the step (b) for determining the positioning setpoint for said speaker is also carried out using at least one characteristic estimated in the step (a) for at least one other speaker from amongst said at least two speakers.

3. The method according to claim 1, further comprising a step of virtual spatialization of the speaker within the virtual space of the listener, using the positioning setpoint for said speaker.

4. The method according to claim 1, in which
   the received digital signal comprises a speech audio signal of the speaker, and
   the step for estimating the characteristic of the speaker as a function of the received digital signal comprises a step for estimating a characteristic of the voice of the speaker as a function of the speech audio signal.

5. The method according to claim 2, further comprising, starting from the characteristics estimated in the step (a) for at least two speakers,
   estimating at least one distance between said speakers, and
   using said at least one estimated distance to determine the positioning setpoints for said at least two speakers.

6. The method according to claim 5, in which the steps (a) and (b) are carried out for at least 3 speakers, and wherein during the step (b), the speakers are ordered in such a manner as to maximize the sum of the distances between neighbouring speakers.

7. The method according to claim 1, in which, pursuant to the arrival of a new speaker, for each of the speakers, the step (b) is carried out for determining the positioning setpoint, using the characteristic estimated for said speaker and from at least one characteristic estimated for at least one other speaker present at the conference.

8. The method according to claim 1, in which, pursuant to the arrival of a new speaker,
   the step (b) is carried out only for the new speaker, and
   the positioning setpoints are modified for the speakers other than the new speaker in order to take the positioning setpoints of the new speaker into account.

9. The method according to claim 1, in which, pursuant to the arrival of a new speaker,
   the step (b) is carried out only for the new speaker, and
   the positioning setpoints for the speakers other than the new speaker remain unchanged.

10. A device designed to be used within a framework of an audio conference between conference participants via their respective terminals, the participants including at least one listener and at least one speaker, the device comprising, for at least said speaker and at least said listener,
   an input for receiving a digital signal coming from a terminal of the speaker;
   processing means for:
      estimating, as a function of the received digital signal, at least one characteristic specific to the speaker, and
      automatically determining, using said at least one estimated characteristic, a positioning setpoint for positioning the speaker within a virtual 3D space of the listener,
   wherein the positioning setpoint is used for spatializing the speaker within the virtual 3D space of the listener; and an output for delivering the positioning setpoint for the speaker.

11. A computer program designed to be stored in a memory of a device designed to be used within a framework of an audio conference between conference participants via their respective terminals, and/or stored on a storage medium designed to cooperate with a reader of said device and/or downloaded via a telecommunications network, the participants including at least one listener and at least one speaker, the program comprising instructions for executing the steps comprising, for at least said speaker and at least said listener, estimating, as a function of a digital signal coming from a speaker's terminal, at least one characteristic specific to the speaker, automatically determining, using said at least one estimated characteristic specific to the speaker, a positioning setpoint for positioning of said speaker within a virtual 3D space of the listener, and spatializing the speaker within the virtual 3D space of the listener, using the positioning setpoint.

* * * * *